US008799618B2

(12) United States Patent
 Cilibrasi

(10) Patent No.: US 8,799,618 B2
(45) Date of Patent: Aug. 5, 2014

(54) SERVICE ASSOCIATED WITH PERSISTENT STORAGE

(75) Inventor: Rudi Cilibrasi, Sunnyvale, CA (US)

(73) Assignee: Empire Technology Development LLC, Wilmington, DE (US)

( * ) Notice: Subject to any disclaimer, the term of this patent is extended or adjusted under 35 U.S.C. 154(b) by 281 days.

(21) Appl. No.: 13/503,628

(22) PCT Filed: Apr. 12, 2011

(86) PCT No.: PCT/US2011/032058
§ 371 (c)(1),
(2), (4) Date: Apr. 23, 2012

(87) PCT Pub. No.: WO2012/141687
PCT Pub. Date: Oct. 18, 2012

(65) Prior Publication Data
US 2012/0290811 A1    Nov. 15, 2012

(51) Int. Cl.
*G06F 12/00* (2006.01)

(52) U.S. Cl.
USPC .......................................................... 711/202

(58) Field of Classification Search
None
See application file for complete search history.

(56) References Cited

U.S. PATENT DOCUMENTS

| | | | |
|---|---|---|---|
| 4,309,569 A | | 1/1982 | Merkle |
| 8,443,166 B2 * | | 5/2013 | Czezatke et al. ............... 711/203 |
| 2002/0095501 A1 | | 7/2002 | Chiloyan et al. |
| 2005/0005194 A1 | | 1/2005 | Scanlan et al. |
| 2008/0082623 A1 * | | 4/2008 | Michael et al. ................ 709/214 |
| 2010/0333116 A1 | | 12/2010 | Prahlad et al. |
| 2011/0060887 A1 | | 3/2011 | Thatcher et al. |
| 2014/0006685 A1 * | | 1/2014 | Peterson et al. ............... 711/102 |
| 2014/0025872 A1 * | | 1/2014 | Flynn et al. ................... 711/103 |

OTHER PUBLICATIONS

Wikipedia, Universally unique identifier, last modified on Aug. 23, 2010, accessed online on Oct. 4, 2010 via http://en.wikipedia.org/wiki/Uuid.
Wikipedia, Uniform resource identifier, last modified on Sep. 21, 2010, accessed online on Oct. 4, 2010 via http://en.wikipedia.org/wiki/Uniform_Resource_Identifier.
Wikipedia, Representational state transfer, last modified on Oct. 2, 2010, accessed online on Oct. 4, 2010 via http://en.wikipedia.org/wiki/REST.
Microsoft Support, Logical block addressing (LBA) defined, last review on Dec. 17, 2000, accessed online on Apr. 9, 2012 via http://support.microsoft.com/kb/122052.
Wikipedia, Logical block addressing, last modified on Jan. 20, 2012, accessed online on Apr. 9, 2012 via http://en.wikipedia.org/wiki/Logical_block_addressing.
Borthakur, Dhruba, The Hadoop distributed file system: architecture design, 2007, accessed online on Apr. 9, 2012 via http://hadoop.apache.org/common/docs/r0.15.3/hdfs_design.pdf.
Kellerman, Jim, HBase: structured storage of sparse data for Hadoop, 2007, accessed online on Apr. 9, 2012 via http://blog.rapleaf.com/wp-content/uploads/2007/12/hbase.pdf.
Hirabayashi, M., Introduction to Tokyo products, 2009, accessed online on Apr. 9, 2012 via http://fallabs.com/tokyocabinet/tokyoproducts.pdf.
United States Patent and Trademark Office, International search report and written opinion of the international searching authority for PCT/US11/32058, mailed on Dec. 5, 2011.

* cited by examiner

*Primary Examiner* — Brian Peugh

(57) ABSTRACT

Examples are disclosed for allocating a block of persistent storage or accessing a block of persistent storage based on a storage service string that includes a universally unique identifier and associated metadata.

48 Claims, 10 Drawing Sheets

String Format 500

```
                         542   544      546           548
snbi://service host/UUID/expire/size/ReadsPerDay/WritesPerDay
  510       520      530 ▲─────────── 540 ───────────▲
```

Table 400

| Row | Name | Bytes | Description |
|---|---|---|---|
| 410 | Identifier | 32 | Universally unique identifier (UUID) for a block of persistent storage |
| 420 | Expire | 8 | Time in seconds from which the block of persistent storage will expire |
| 430 | Size | 1 | Log base 2 of the size of the data payload for the block of persistent storage |
| 440 | ReadsPerDay | 1 | (Log base 2 of number of reads per day +1) - 1 |
| 450 | WritesPerDay | 1 | (Log base 2 of number of writes per day +1) - 1 |

FIG. 4

String Format 500 snbi://service host/UUID/expire/size/ReadsPerDay/WritesPerDay
  510         520    530    542  544   546      548
                            └──────────── 540 ────────────┘

FIG. 5

SNBI Table 600

| | Service Host | UUID | Expire | Size | RPD | WPD |
|---|---|---|---|---|---|---|
| 610 | Local Host | 3f3ed5d7605376c3453f223dd5daa43ca7611b672abcbb3823456c38245378cb | 1278448474 | 12 | 9 | 9 |
| 620 | Remote Host | 2c7fa8c331429;e2764a168ce4acc72da8323a598bbbbb5644793a793116955ea | 1280325566 | 18 | 9 | 8 |

FIG. 6

1100 A computer program product.

1102 A signal bearing medium.

1104 instructions for a file system or application to access a block of persistent storage, which, when executed by logic, cause the logic to:

obtain a service storage string that includes a universally unique identifier and metadata, the metadata to indicate one or more characteristics for a storage service associated with the block of persistent storage; or forward the storage service string to a storage device driver to submit a read request for the storage service associated with the block of persistent storage, wherein based, at least in part, on the storage service string, the storage device driver is to be configured to fulfill the read request by accessing the block of persistent storage from persistent storage accessible to the storage device driver.

| 1106 a computer-readable medium. | 1108 a recordable medium. | 1111 a communications medium. |

FIG. 11

SERVICE ASSOCIATED WITH PERSISTENT STORAGE

BACKGROUND

Unless otherwise indicated herein, the approaches described in this section are not prior art to the claims in this application and are not admitted to be prior art by inclusion in this section.

Data may be stored persistently on/in storage devices that may include hard drives. Typically, storage device drivers associated with these storage devices may organize or allocate fixed-sized blocks of persistent storage via use of a one-dimensional, linear block indexing model such as a dense integer index. A dense integer index has been one of the more common ways to allocate a block of persistent storage for smaller file systems or data centers that may include one or only a few hard drives. One type of dense integer index that was developed several years ago for these smaller file systems is known as Logical Block Addressing (LBA).

Recently, as larger file-systems or data centers having an increasing number of disk drives became more common, continued use of dense integer indexes such as LBA are beginning to have increasingly negative effects on data integrity, reliability and management overhead costs. These negative effects, for example, may have been caused by a lack of flexibility associated with a dense integer index that uses fixed-sized blocks of persistent storage that may have been allocated using an index designed for much smaller data systems. Thus, as the number of hard drives and the number of possible blocks of persistent storage maintained at a data center increased, the chances that some identifiers may match or collide also increased. As a result of large data centers, management overhead costs and system complexity have both increased in order to prevent collisions and maintain data integrity.

SUMMARY

The present disclosure describes some example methods for allocating a block of persistent storage. These example methods may include generating a universally unique identifier for the block of persistent storage and forming a storage service string to include the universally unique identifier and metadata. The metadata may indicate one or more characteristics for a storage service associated with the block of persistent storage. The storage service string may then be forwarded to a storage device driver. In some examples, based at least in part on the storage service string, the storage device driver may be configured to allocate the block of persistent storage from persistent storage accessible to the storage device driver.

The present disclosure also describes other example methods for allocating a block of persistent storage. These other example methods may include receiving at a storage device driver a storage service string that includes a universally unique identifier and metadata. The metadata may indicate one or more characteristics for a storage service associated with the block of persistent storage. The block of persistent storage may then be allocated based, at least in part, on the storage service string. In some examples, the block of persistent storage may be allocated from available persistent storage accessible to the storage device driver.

The present disclosure also describes example methods for a file system or application to access a block of persistent storage. These example methods may include obtaining a storage service string that includes a universally unique identifier and metadata. The metadata may indicate one or more characteristics for a storage service associated with the block of persistent storage. The storage service string may then be forwarded to a storage device driver to submit a read request for the storage service associated with the block of persistent storage. In some examples, based at least in part on the storage service string, the storage device driver may be configured to fulfill the read request by accessing the block of persistent storage from persistent storage accessible to the storage device driver.

The present disclosure also describes example devices (e.g., storage device drivers) for fulfilling a read request associated with a block of persistent storage. The example devices may include a service manager having logic. The logic may be configured to receive a storage service string that includes a universally unique identifier and metadata. The metadata may indicate one or more characteristics for a storage service associated with the block of persistent storage. In some examples, the logic may also be configured to fulfill the read request by accessing the block of persistent storage and provide data maintained therein to the requestor based, at least in part, on the storage service string.

The present disclosure also describes example systems for allocating a block of persistent storage. These example systems may include a persistent storage device, an application and a storage device driver. In some examples, the application may include an index manager having index logic configured to generate a universally unique identifier for the block of persistent storage. The index logic may also be configured to form a storage service string to include the universally unique identifier and metadata. The metadata may indicate one or more characteristics for a storage service associated with the block of persistent storage. The index logic may further be configured to forward the storage service string to submit an allocation request for the block of persistent storage. In some examples, the storage device driver may include a service manager having service logic configured to receive the storage service string forwarded from the application. The service logic may also be configured to allocate the block of persistent storage to fulfill the allocation request based, at least in part, on the storage service string. In some examples, the block of persistent storage may be allocated from available persistent storage maintained at the persistent storage device.

The present disclosure also describes example computer program products. In some examples, the computer program products may include a non-transitory medium having instructions for a file system or application to access a block of persistent storage. The instructions, which, when executed by the logic may cause the logic to obtain a storage service string that includes a universally unique identifier and metadata. The metadata may indicate one or more characteristics for a storage service associated with the block of persistent storage. The instructions may also cause the logic to forward the storage service string to a storage device driver to submit a read request for the storage service associated with the block of persistent storage. In some examples, based at least in part on the storage service string, the storage device driver may be configured to fulfill the read request by accessing the block of persistent storage from persistent storage accessible to the storage device driver.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 4 illustrates an example table including information for forming a storage service string;

FIG. 5 illustrates an example string format for a storage service string;

FIG. 6 illustrates an example table 600 including entries for a storage service string;

FIG. 11 illustrates a block diagram of an example computer program product; and

Figure 1:
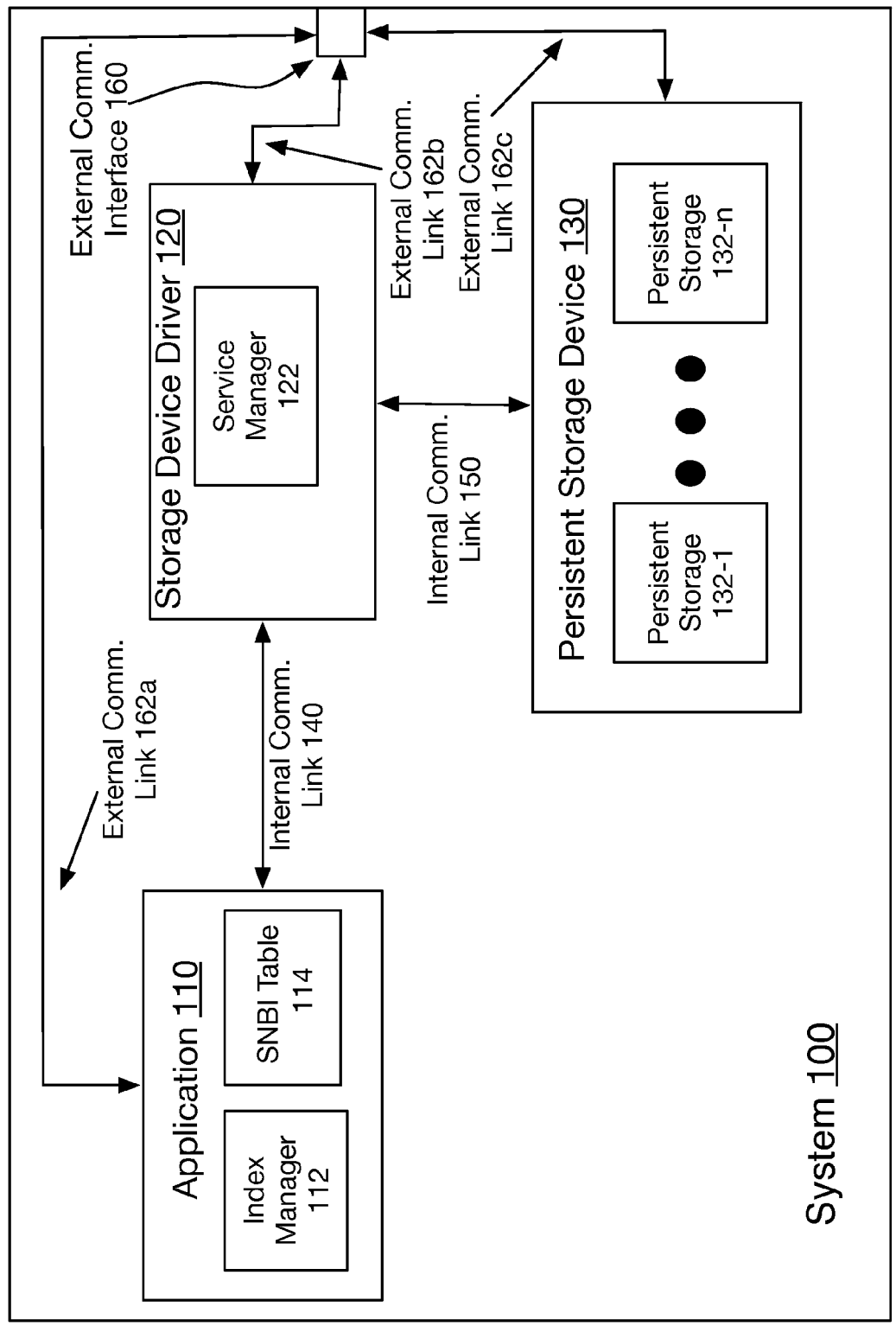
FIG. 1 illustrates an example system for allocating a block of persistent storage.

all arranged in accordance with at least some embodiments of the present disclosure.

DETAILED DESCRIPTION

In the following detailed description, reference is made to the accompanying drawings, which form a part hereof. In the drawings, similar symbols typically identify similar components, unless context dictates otherwise. The illustrative examples or embodiments described in the detailed description, drawings, and claims are not meant to be limiting. Other examples or embodiments may be utilized, and other changes may be made, without departing from the spirit or scope of the subject matter presented here. It will be readily understood that aspects of this disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, systems and computer program products related to a storage service associated with blocks of persistent storage.

As contemplated in the present disclosure, use of dense integer indexes such as LBA may have negative effects on data integrity, reliability and management overhead costs for data centers or computer systems having a large number of interconnected hard drives. As the amount of data being managed at a data center increases (e.g., more hard drives), the costs for basic operations such as data replication or data consistency checking become supra-linearly higher in an expanding data center. This may lead to rather large investments in fault tolerance schemes that may undergo expensive data migration cycles on a frequent basis. Also, at least a portion of a data center may experience an outage. Typical storage architectures that use dense integer indexes may not have enough isolation or encapsulation to avoid unacceptable levels of systemic reliability. Further, increasing aggregate data sizes for today's highly active, highly interconnected data center(s) may continue to lead to unacceptable levels of systemic reliability when using types of dense integer indexes such as LBA to allocate blocks of persistent storage.

In some examples, a system for allocating a block of persistent storage may include a persistent storage device (e.g., composed of one or more hard drives), an application or file system and a storage device driver. The application or file system may include an index manager having index logic configured to generate a universally unique identifier for the block of persistent storage. The index logic may also be configured to form a storage service string to include the universally unique identifier and metadata. The metadata may indicate one or more characteristics for a storage service associated with the block of persistent storage. The index logic may further be configured to forward the storage service string to submit an allocation request for the block of persistent storage. In some examples, the storage device driver may include a service manager having service logic configured to receive the storage service string forwarded from the application or file system. The service logic may also be configured to allocate the block of persistent storage to fulfill the allocation request based, at least in part, on the storage service string. In some examples, the block of persistent storage may be allocated from available persistent storage maintained at or by the persistent storage device.

FIG. 1 illustrates an example system 100 for allocating a block of persistent storage. As shown in FIG. 1, system 100 includes application 110, storage device driver 120 and persistent storage device 130. As depicted in FIG. 1, application 110 and storage device driver 120 may be coupled via internal communication link 140. Also, storage device driver 120 may be coupled via internal communication link 150 to persistent storage device 130. Further, as shown in FIG. 1, application 110, storage device driver 120 and persistent device storage 130 may be separately or jointly coupled to external communication interface 160 via external communication links 162a-c. In some examples, as shown in FIG. 1, application 110 may include an index manager 112 and a sparse non-deterministic block index (SNBI) table 114. Also, in some examples, storage device driver 120 may include a service manager 122 and persistent storage device 130 may include any number of blocks of persistent storage 132-1 through 132-n.

According to some examples, application 110 may include one or more applications and/or file systems to perform one or more tasks that may require the need to write to and/or read from a block of persistent storage (e.g., maintained by persistent storage device 130). Application 110 may include, but is not limited to, an application suite (e.g., a compilation of word processing and spreadsheet applications), enterprise software (e.g., customer relationship management (CRM)), enterprise infrastructure software (e.g., databases, e-mail servers, etc.), information worker software, content access software, simulation software, mobile applications, product engineering software, graphical user interface (GUI), etc.

As shown in FIG. 1, application 110 includes index manager 112 and SNBI table 114. As described more below, index manager 112 may form a storage service string and use SNBI table 114 to maintain information associated with that storage service string. The formed storage service string may be forwarded to a storage device driver (e.g., storage device driver 120) and the storage device driver may allocate a block of persistent storage (e.g., persistent storage 132-1) from persistent storage (e.g., maintained by persistent storage device 130) that may be accessible to storage device driver 120 via internal communication link 150. Also, as described more below, index manager 112 may obtain at least a portion of a previously formed storage service string from SNBI table 114 in order to submit a read request for a storage service associated with a block of persistent storage. Although not shown in FIG. 1, in alternative examples, another SNBI table may be externally located and accessible to application 110 via external communication link 162a through external communication interface 160. For these alternative examples, the other SNBI table may be used in a similar manner as SNBI table 114 mentioned above.

As shown in FIG. 1, storage device driver 120 may communicatively couple with application 110 via internal communication link 140. Storage device driver 120 may also communicatively couple to applications (not shown) remote to system 100 via external communication link 162b through external communication interface 160. In some examples, service manager 122 of storage device driver 120 may include logic and/or features that are configured to receive a storage service string from application 110 or a remote application. Service manager 122 may also include logic and/or features configured to allocate a block of persistent storage (e.g., persistent storage 132-1) based on the received storage service string.

Also as shown in FIG. 1, persistent storage device 130 includes persistent storage 132-1 to 132-n. In some examples, persistent storage 132-1 to 132-n include blocks of memory maintained by persistent storage device 130. Persistent storage 132-1 to 132-n may include separate blocks of addressable persistent storage maintained entirely on a single hard drive or maintained separately on any number of hard drives. The single hard drive or multitude of hard drives may include, but is not limited to, any combination of solid state hard drives (e.g., flash drives) or hard disk drives. Also, persistent storage 132-1 to 132-n may be addressable blocks of persistent storage maintained on one or more hard drives that may be directly attached to system 100 (e.g., via internal communication link 150) and/or maintained on one or more hard drives that may be remotely attached to system 100 (e.g. via external communication link 162c). Thus, although not shown in FIG. 1, persistent storage device 130 may include at least some persistent storage blocks that may be maintained remotely to system 100. For example, via use of network-attached persistent storage coupled to system 100 through external communication interface 160.

In some examples, system 100 may include a single computing platform (e.g., a computer, a server, etc.) and as such, application 110, storage device drive 120 and persistent storage 130 may be co-located and/or supported by the single computing platform. For these examples, internal communication links 140 and 150 may operate according to various communication protocols to include, but not limited to, Universal Serial Bus (USB), PCI-Express, Serial Advanced Technology Attachment (SATA), Parallel Advanced Technology Attachment (PATA) or small computer system interface (SCSI). In other examples, system 100 may include a number of computing platforms and at least one of application 110, storage device drive 120 and persistent storage device 130 may be located on different computing platforms. For these other examples, internal communication links 140 and 150 may operate according to various peripheral communication protocols to include USB, PCI-Express, external SATA (eSATA) or Institute of Electrical and Electronics Engineers (IEEE) 1394 and/or various network communication protocols (wired or wireless) to include, but not limited to, IEEE 802.1, IEEE 802.11, IEEE 802.16, GSM, GPRS, EDGE, W-CDMA, HSPA, LTE, CDMA-2000, EV-DO. Also, in either a single or a multiple computing platform example, external communication links 162a-c in conjunction with external communication interface 160 may operate according to similar network communication protocols (wired or wireless).

Figure 2:
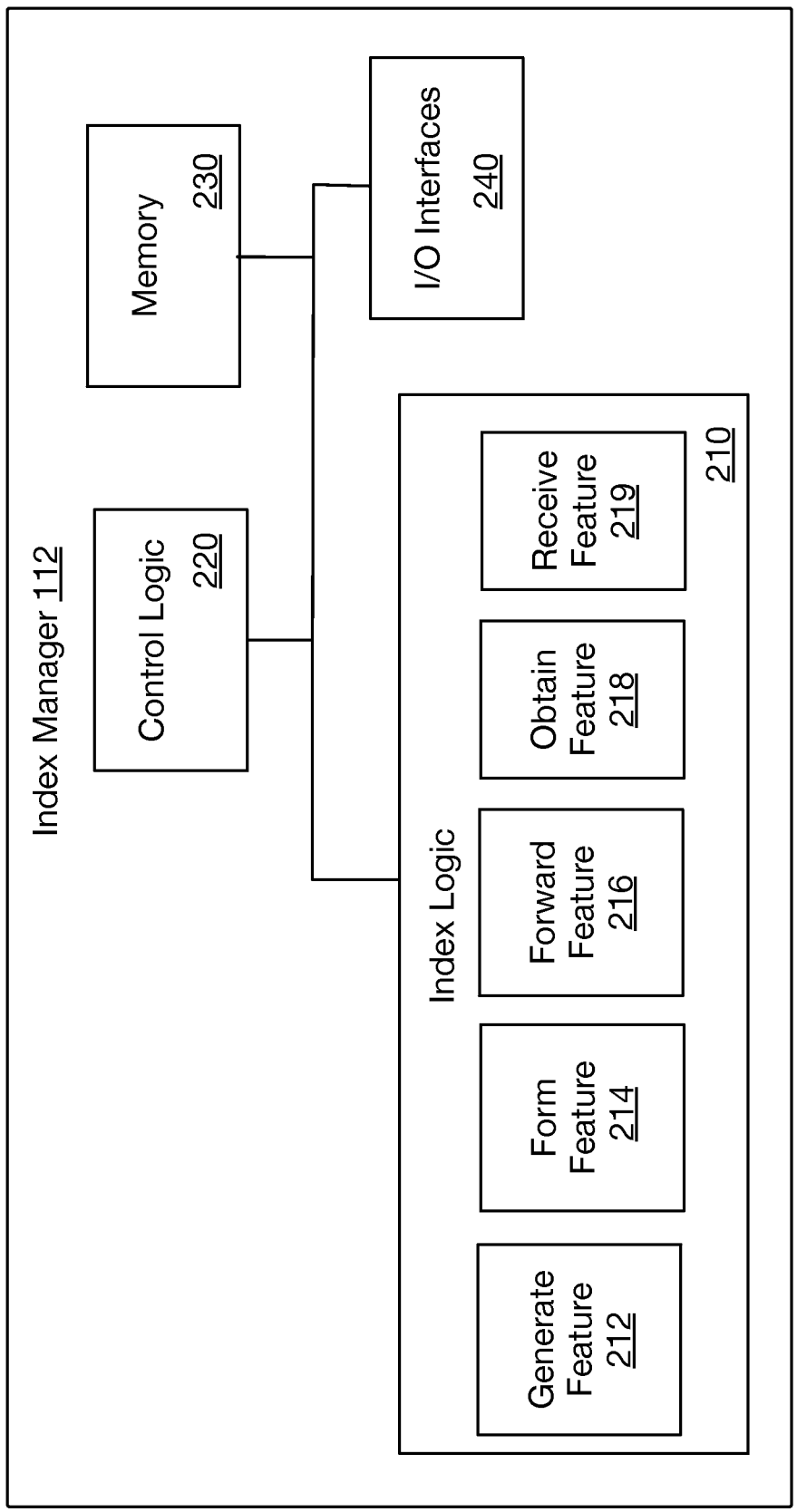
FIG. 2 illustrates a block diagram of an example architecture for an index manager.

FIG. 2 illustrates a block diagram of an example architecture for an index manager 112. As described above for system 100 in FIG. 1, application 110 may include an index manager 112. In some examples, index manager 112 includes features and/or logic configured or arranged for generating, forming, obtaining or forwarding. In some other examples, the features and/or logic may also be configured to receive data associated with the storage service string.

The example index manager 112 of FIG. 2 includes index logic 210, control logic 220, memory 230 and input/output (I/O) interfaces 240. As illustrated in FIG. 2, index logic 210 is coupled to control logic 220, memory 230 and I/O interfaces 240. Index logic 210 may further include one or more of a generate feature 212, a form feature 214, an obtain feature 216, a forward feature 218 or a receive feature 219, or any reasonable combination thereof.

In some examples, the elements portrayed in FIG. 2's block diagram are configured to support or enable index manager 112 as described in this disclosure. A given index manager 112 may include some, all or more elements than those depicted in FIG. 2. For example, index logic 210 and control logic 220 may separately or collectively represent a wide variety of logic device(s) to implement the features of index manager 112. An example logic device may include one or more of a computer, a microprocessor, a microcontroller, a field programmable gate array (FPGA), an application specific integrated circuit (ASIC), a sequestered thread or a core of a multi-core/multi-threaded microprocessor or a combination thereof.

In some examples, as shown in FIG. 2, index logic 210 includes one or more of a generate feature 212, a form feature 214, a forward feature 216, an obtain feature 218 or a receive feature 219. Index logic 210 may be configured to use one or more of these features to perform operations. As described in more detail below, example operations may include generating, forming, obtaining or forwarding a storage service string to a storage device driver. The example operations may also include receiving data associated with the storage service string.

In some examples, control logic 220 may be configured to control the overall operation of index manager 112. As mentioned above, control logic 220 may represent any of a wide variety of logic device(s) configured to operate in conjunction with executable content or instructions to implement the control of index manager 112. In some alternate examples, the features and functionality of control logic 220 may be implemented within index logic 210.

According to some examples, memory 230 is arranged to store executable content or instructions. The executable content or instructions may be used by control logic 220 and/or index logic 210 to implement or activate features or elements of index manager 112. Memory 230 may also be arranged to temporarily maintain storage service string information such as a universally unique identifier and metadata that may indicate one or more characteristics for a storage service associated with a block of persistent storage. In some examples, the temporarily maintained storage service string information may be used to form the storage service string and forward the storage service string to a storage device driver (e.g., storage device driver 120).

Memory 230 may include a wide variety of memory media including, but not limited to, one or more of volatile memory, non-volatile memory, flash memory, programmable variables or states, random access memory (RAM), read-only memory (ROM), or other static or dynamic storage media.

In some examples, I/O interfaces 240 may provide an interface between index manager 112 and elements or devices that may be communicatively coupled to application 110. For example, as mentioned above for FIG. 1, application 110 may be configured to communicatively couple to storage device driver 120 via internal communication link 140 or may be configured to communicatively couple to elements remote to system 100 via external communication link 162a. The I/O interfaces 240, for example, may include an interface configured to operate according to various wireless and/or wired communication protocols to allow index manager 112 to communicate over these internal/external communication links (e.g., USB, SATA, PATA, SCSI, eSATA, PCI-Express, IEEE 802.1, IEEE 802.11, IEEE 802.16, GSM, GPRS, EDGE, W-CDMA, HSPA, LTE, CDMA-2000, EV-DO, etc.).

Figure 3:
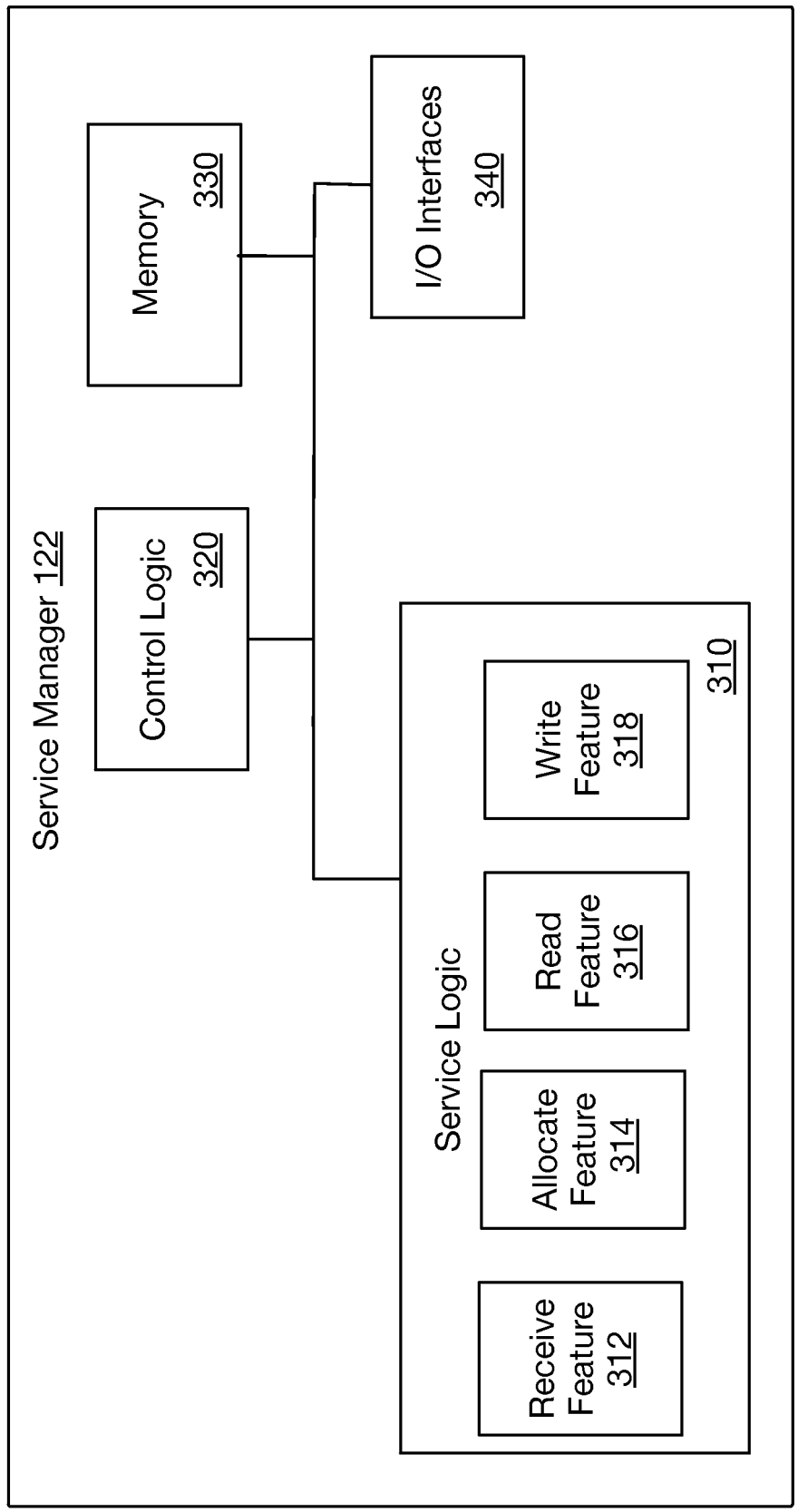
FIG. 3 illustrates a block diagram of an example architecture for a service manager.

FIG. 3 illustrates a block diagram of an example architecture for a service manager 122. As described above for system 100 in FIG. 1, storage device driver 120 may include a service manager 122. In some examples, service manager 122 includes features and/or logic configured or arranged for receiving a storage service string and allocating a block of persistent storage based on the storage service string. The features and/or logic may also be configured to fulfill a read or write request based on the storage service string.

The example service manager 122 of FIG. 3 includes a service logic 310, a control logic 320, a memory 330 or a input/output (I/O) interfaces 340. As illustrated in FIG. 3, source logic 310 is coupled to control logic 320, memory 330 and I/O interfaces 340. Source logic 310 may further include one or more of a receive feature 312, an allocate feature 314, a read feature 316 or a write feature 318, or any reasonable combination thereof.

In some examples, the elements portrayed in FIG. 3's block diagram are configured to support or enable service manager 122 as described in this disclosure. A given service manager 122 may include some, all or more elements than those depicted in FIG. 3. For example, source logic 310 and control logic 320 may separately or collectively represent a wide variety of logic device(s) to implement the features of service manager 122. An example logic device may include one or more of a computer, a microprocessor, a microcontroller, an FPGA, an ASIC, a sequestered thread or a core of a multi-core/multi-threaded microprocessor or a combination thereof.

In some examples, as shown in FIG. 3, source logic 310 includes one or more of a receive feature 312, an allocate feature 314, a read feature 316 or a write feature 318. Source logic 310 may be configured to use one or more of these features to perform operations. As described in more detail below, example operations may include receiving a storage service string and allocating a block of persistent storage based on the storage service string. The operations may also include fulfilling a read or write request based on the storage service string.

In some examples, control logic 320 may be configured to control the overall operation of service manager 122. As mentioned above, control logic 320 may represent any of a wide variety of logic device(s) configured to operate in conjunction with executable content or instructions to implement the control of service manager 122. In some alternate examples, the features and functionality of control logic 320 may be implemented within source logic 310.

According to some examples, memory 330 is arranged to store executable content or instructions. The executable content or instructions may be used by control logic 320 and/or source logic 310 to implement or activate features or elements of service manager 122. Memory 330 may also be arranged to temporarily maintain storage service string information. Temporarily maintained storage service string information may be used to allocate a block of persistent storage (e.g., maintained by persistent storage device 130) or fulfilling read/write requests.

Memory 330 may include a wide variety of memory media including, but not limited to, one or more of volatile memory, non-volatile memory, flash memory, programmable variables or states, RAM, ROM, or other static or dynamic storage media.

In some examples, I/O interfaces 340 may provide an interface between source manager 122 and elements or devices that may be communicatively coupled to storage device driver 120. For example, as mentioned above for FIG. 1, storage device driver 120 may be configured to communicatively couple to application 110 or persistent storage device 130 via internal communication links 140, 150, respectively. Also, as mentioned above, storage device driver 120 may be configured to communicatively couple to elements remote to system 100 via external communication link 162b. The I/O interfaces 340, for example, may include an interface configured to operate according to various wireless and/or wired communication protocols to allow service manager 122 to communicate over these internal/external communication links (e.g., USB, SATA, PATA, SCSI, eSATA, PCI-Express, IEEE 802.1, IEEE 802.11, IEEE 802.16, GSM, GPRS, EDGE, W-CDMA, HSPA, LTE, CDMA-2000, EV-DO, etc.).

FIG. 4 illustrates an example table 400 including information for forming a storage service string. In some examples, table 400, as shown in FIG. 4, includes rows 410-450 which may be used to populate one or more fields of a storage service string that may be formed by an application (e.g., application 110). The application may include logic and/or features (e.g., index manager 112) to form the storage service string according to at least some of the information included in table 400.

According to some examples, row 410 indicates that a storage service string may include a 32-byte universally unique identifier (UUID) for a block of persistent storage. An application or file system, for example, may include logic and/or features (e.g., index manager 112) to locally generate the 32-byte UUID. In some examples, the logic and/or features of the application may generate the 32-byte UUID randomly such that the probability of the UUID being repeated is very unlikely.

According to some examples, row 420 indicates that a storage service string may include an 8-byte expire indication for a block of persistent storage. The 8-byte expire indication may be part of metadata that indicates a characteristic for a storage service associated with the block of persistent storage. In some examples, the 8-byte expire indication may be an expiration time period after which the block of persistent storage expires and becomes unallocated. Thus, for example, the storage service associated with the expired block of persistent storage would no longer be available. The 8-byte expire indication, in some examples, may be an indication of a number of seconds since the epoch from which the block of persistent storage may be set to expire. For example, the epoch may be based on a reference date of Jan. 1, 1970. The reference date of Jan. 1, 1970 may be referred to as "Unix time". Although this disclosure is not limited to only an epoch with a reference date of Jan. 1, 1970.

In some examples, an expiration time period may allow a storage service provider or service host to limit costs associated with allocating at least portions of persistent storage blocks to applications. Setting an expiration time period may oblige applications to responsibly consider data maintenance and life cycle issues explicitly within bounded aggregate cost at allocation time for some or all persistent storage blocks. Also, a service host may bill or value a given storage service based on the length of time for a given expiration time period. For example, a longer expiration time period may tie up a block of persistent storage that could otherwise be used by other applications. As a result of longer tie up periods, the service host may charge more or bill at a higher rate for a longer expiration time period.

According to some examples, row 430 indicates that a storage service string may include a 1-byte size indication for a block of persistent storage. The 1-byte size indication may also be part of metadata that indicates a characteristic for a storage service associated with the block of persistent storage. In some examples, the 1-byte size indication may indicate the overall size of the block of persistent storage that may be allocated. As shown in FIG. 4, the 1-byte size indication may indicate a log base 2 of the size of the block of persistent storage. The size may be in bytes, although this disclosure is not limited to only size indications in bytes. For example, a 1-byte size indication that indicates a decimal value of 12 would have a size value of 2 to the $12^{th}$ power or 4096 bytes.

According to some examples, row 440 indicates that a storage service string may include a 1-byte ReadsPerDay indication for a block of persistent storage. The 1-byte ReadsPerDay indication may also be part of metadata that indicates a characteristic for a storage service associated with the block of persistent storage. In some examples, a limit may be placed on the number of times in given time period (e.g., 24 hours or a day) that the block of persistent storage may be read or accessed. In some examples, a charge or bill for a storage service associated with the block of persistent storage may be higher for a high number of reads in a given day compared to a low number of reads. The higher charge may be attributed to the additional workload placed on logic and/or features of a service host that may be configured to provide or obtain data maintained in the block of persistent storage to fulfill a read request.

According to some examples, row 450 indicates that a storage service string may include a 1-byte WritesPerDay indication for a block of persistent storage. The 1-byte WritesPerDay indication may also be part of metadata that indicates a characteristic for a storage service associated with the block of persistent storage. In some examples, a limit may be placed on the number of times in given time period (e.g., 24 hours or a day) that the block of persistent storage may be written to. In some examples, a charge or bill for a storage service associated with the block of persistent storage may be higher for a high number of writes in a given day compared to a low number of writes. Similar to charges for reads per day, the higher charge for writes per day may be attributed to the additional workload placed on logic and/or features of a service host that may be configured to fulfill a write request at a higher frequency or rate.

FIG. 5 illustrates an example string format 500 for a storage service string. In some examples, utilizing table 400, logic and/or features of an application may be configured to form a storage service string in the format of string format 500. As shown in FIG. 5, in some examples, a string format 500 may include an snbi field 510, a service host field 520, a UUID field 530 and a metadata field 540. Also, metadata field 540 as shown in FIG. 5 may include an expire sub-field 542, a size sub-field 544, a ReadsPerDay sub-field 546 or a WritesPerDay sub-field 548. As described more below, fields 530, 540 and sub-fields 542-548 may include the information described above for table 400.

In some examples, snbi field 510 may indicate that a storage service string in the format of string format 500 was formed based, at least in part, on a sparse non-deterministic block index. In some examples, the information in snbi field 510 may indicate to an application (e.g., application 110) that the application may need to access (locally or remotely) an SNBI table to either store information associated with a storage service string or to obtain information associated with a storage service for a block of persistent storage.

As shown in FIG. 5, sting format 500 includes service host field 520. Service host field 520 may indicate a location of a service host that is servicing a storage service associated with a block of persistent storage. The service host may be a computing platform and/or operating system configured to support a storage device driver that allocates the block of persistent storage. For example, using system 100 as shown in FIG. 1, an indication of a local service host (e.g., local host) may indicate that application 110 expects elements of system 100 (e.g., storage device driver 120 and/or persistent storage device 130) to service a storage service associated with a block of persistent storage. Alternatively, an indication of a remote service host (e.g., remote host) may indicate that application 110 expects elements of a system located remotely to system 100 to service the storage service.

According to some examples, in order to form a storage service string in the format of string format 500, an application may include logic and/or features configured to encode information described above for table 400 using an architectural style such as the Representational State Transfer (REST) architectural style to form a Uniform Resource Identifier (URI). Also, an application may include logic and/or features configured to forward the storage service string in the format of string format 500 using Hypertext Transfer Protocol (HTTP). In some examples, the REST architectural style, URI or HTTP may be used in accordance with various industry standards or publications. The various industry standards or publications may include a publication by The Internet Society, Request for Comments (RFC): 2626 "Hypertext Transfer Protocol—HTTP/1.1", published in 1999 or a publication by the Internet Engineering Task Force (IETF), RFC: 5785, "Defining Well-Known Uniform Resource Identifiers (URIs)", published in 2010.

In some examples, using the REST architectural style, fields 510-540 and sub-fields 542-548 may be joined with slashes to form a storage service string in the format of string format 500. As mentioned above, with the exception of snbi field 510 and service host field 520, the fields depicted in FIG. 5 for string format 500 may include the information from table 400. The information from table 400, for example, may be written in a respective field in either hexadecimal or decimal format. Below is an example storage service string (1) in the format of string format 500 that may be formed using the REST architectural style. Example storage service string (1): snbi://localhost/3f3ed5d7605376c3453f223dd5daa43ca 7611b672abcbb382 3456c38245378cb/1278448474/12/9/9

The example storage service string (1) in the format of string format 500 indicates "snbi" in snbi field 510 and "localhost" in service host field 520. The example storage service string (1) also includes a hexadecimal value in UUID field 530 to indicate a universally unique identifier for a block of persistent storage. The example storage service string (1) also includes information in metadata field 540 that indicates that a service associated with the block of persistent storage has an expiration of the morning of Jul. 7, 2010 with a size of 4096 (two to the twelfth power) bytes and a read/write limit or quota of 1023 (two to the 10th power minus one) of each per day. In some examples, as shown above, the metadata in the example storage service string (1) may be written using decimal values.

The example storage service string (1) may be referred to as a fully elaborated SNBI URI. Example storage service string (1) may be written in a shortened form as shown below. Example storage service string (2):
snbi://localhost/3f3ed5d7605376c3453f223dd5daa43ca 7611b672abcbb3823456c38245378cb The example storage service string (2) does not include the metadata field and may be used to provide just a minimal amount of information necessary to distinguish a block of persistent storage from other blocks of persistent storage. In some examples, service host information may be removed to provide and even shorter form as shown below. Example storage service string (3):
snbi://3f3ed5d7605376c3453f223dd5daa43ca 7611b672abcbb3823456c38245378cb The example storage service string (3), for example, may provide the minimum amount of information needed to read/write to the block of persistent storage. In some examples, an operating system for a system (e.g., system 100) may decide how to handle a service request based merely on the information indicated in example storage service string (3). For example, the operating system may access an SNBI table that may be maintained either locally or remotely to obtain or acquire the remaining information. The remaining information may include the information shown above for either example storage service string (1) or example storage service string (2).

FIG. 6 illustrates an example SNBI table 600 including entries for a storage service string. As shown in FIG. 6, SNBI table includes entry 610 and entry 620. In some examples, SNBI table 600 may be similar to SNBI table 114 shown in FIG. 1. For these examples, SNBI table 600 may be maintained with or by an application (e.g., application 110). The application may be located locally or remotely. The application may be configured to include logic and/or features to create an entry in SNBI table 600 and/or access an entry from SNBI table 600.

In some examples, as shown in FIG. 6, entry 610 includes the information mentioned above for example storage service string (1). Entry 620, for example, may include information for a different block of persistent storage than the block of persistent storage indicated in entry 610. Thus, as shown in FIG. 6, entry 620 indicates a remote host as the service host and includes a different UUID and associated metadata to indicate characteristics for a storage service associated with the different block of persistent storage.

Figure 7:
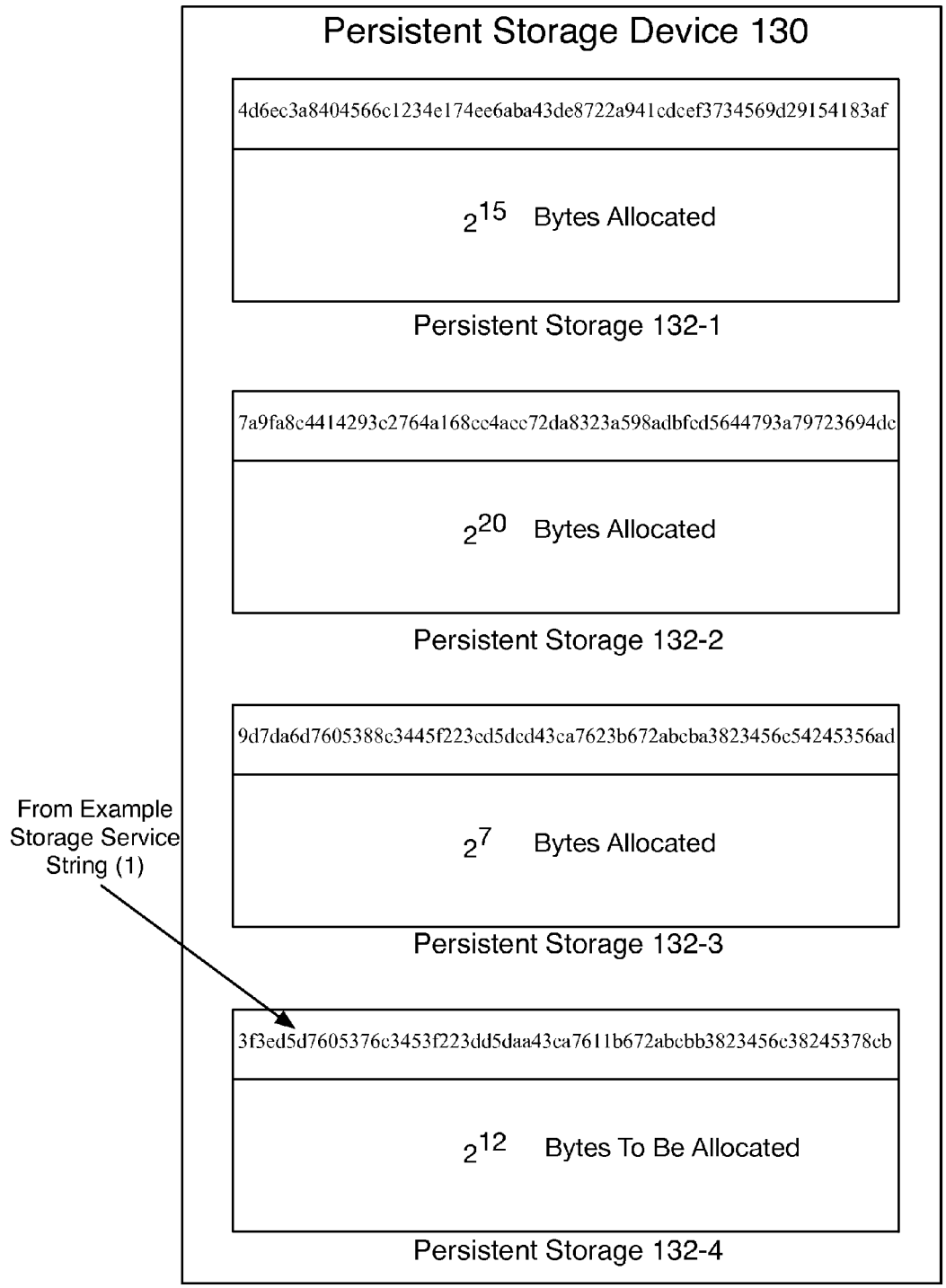
FIG. 7 illustrates a block diagram of allocated and to be allocated blocks of persistent storage.

FIG. 7 illustrates a block diagram of allocated and to be allocated blocks of persistent storage for persistent storage 132-1 to 132-4. In some examples, as mentioned above for FIG. 1, persistent storage device 130 includes blocks of persistent storage 132-1 to 132-n that may be accessible to storage device driver 120. As mentioned above, a storage service string formed or obtained by an application (e.g., application 110) may be forwarded to storage device driver 120. Also, storage device driver 120 may be configured to include logic and/or features to either allocate blocks of persistent storage 132-2 to 132-n or fulfill a read/write request based, at least in part, on the storage service string (e.g., in the format of string format 500).

As shown in FIG. 7, three blocks of persistent storage 132-1 to 132-3 may have already been allocated and a fourth block of persistent storage, which is shown as persistent storage 132-4 is to be allocated based on the information included in a storage service string (e.g., example storage service string (1)). In some examples, as shown in FIG. 7, variable sizes of data may be accommodated for each allocated block of persistent storage. Accommodating variable sizes of data may include physically configuring memory cells associated with blocks of persistent storage based on information included in a given storage service string. For example, memory cells associated with persistent storage 132-4 may be configured to include a data size of 4096 bytes based on the information included in example storage service string (1). In some examples, storage device driver 120 may include logic and/or features (e.g., service manager 122) configured to allocate and/or cause memory cells associated with persistent storage 132-4 to be configured to accommodate variable data sizes. Also, as shown in FIG. 7, the other blocks of allocated persistent storage may be separately configured to store different sizes of data.

Figure 8:
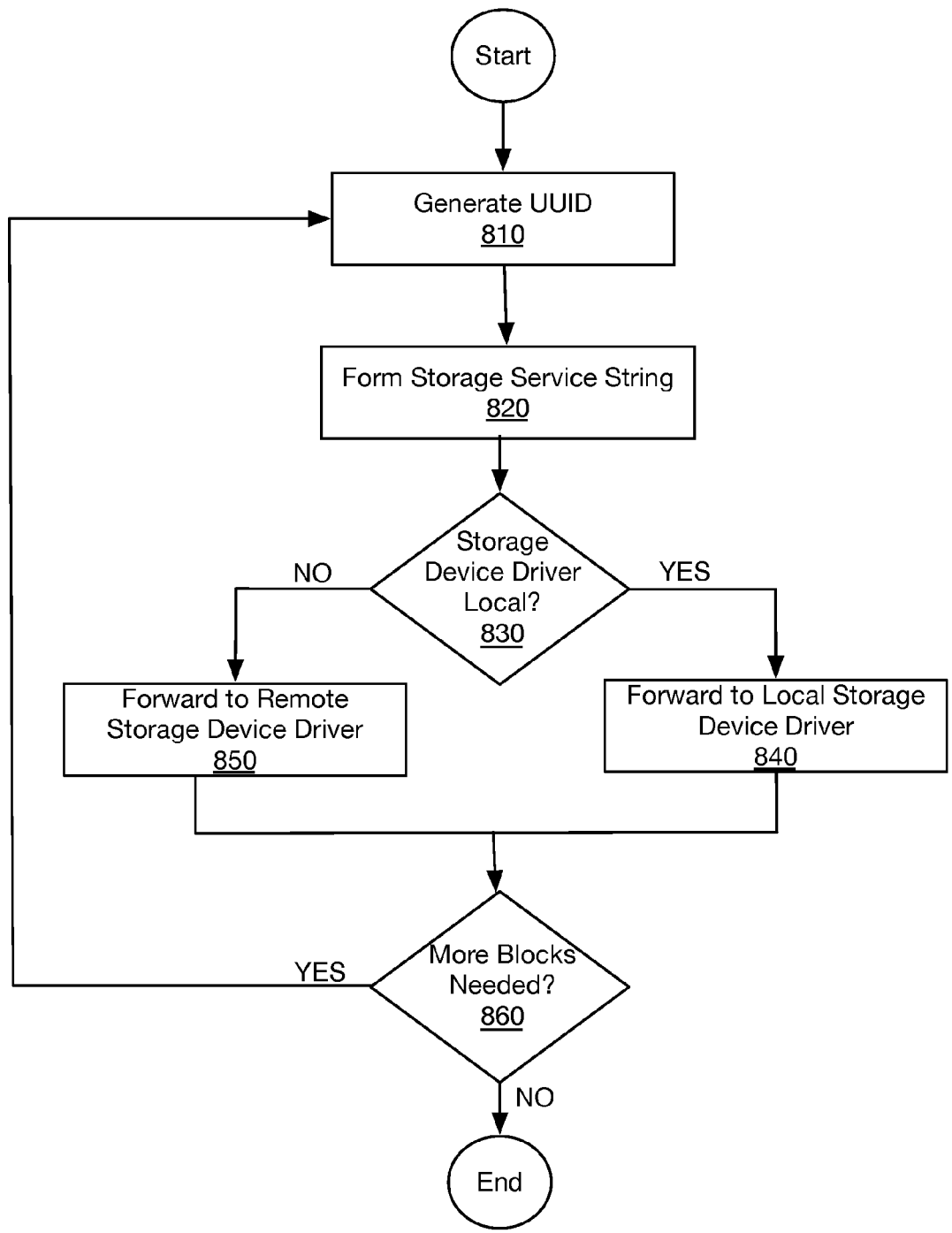
FIG. 8 illustrates a flow chart of example methods for allocating a block of persistent storage.

FIG. 8 illustrates a flow chart of example methods for allocating a block of persistent storage. In some examples, system 100 as shown in FIG. 1, is used to illustrate example methods related to the flow chart depicted in FIG. 8. An index manager 112 as shown in FIG. 2, a storage service string in the format of string format 500 as shown in FIG. 5, or a block of persistent storage 132-4 as shown in FIG. 7 may also be used to illustrate the example methods. But the described methods are not limited to implementations as shown in or described for FIG. 1, 2, 5, 7 or 8. The example methods may be implemented on other systems or managers having one or more of the elements depicted in FIG. 1 or 2. Also, other formats than string format 500 or other configurations of blocks of persistent storage as shown in FIG. 7 may be used when implementing the example methods.

Moving from the start and beginning at block 810 (Generate UUID), index manager 112 may include logic and/or features configured to generate a UUID (e.g., via generate feature 212) for a block of persistent storage that may be needed by Application 110. As mentioned above, the logic and/or features of the application may generate the 32-byte UUID randomly such that the probability of the UUID being repeated is very unlikely. In some examples, a storage service may also be associated with the block of persistent storage.

Continuing from block 810 to block 820 (Form Storage Service String), index manager 112 may include logic and/or features configured to form (e.g., via form feature 214) a storage service string in the format of string format 500. In some examples, the storage service string may include the generated UUID and metadata. The metadata may indicate one or more characteristics for the storage service associated with the block of persistent storage. The forming of the storage service string may include encoding the UUID and metadata using the REST architectural style to form a URI similar to example storage service string (1) described above.

Continuing from block 820 to decision block 830 (Storage Device Driver Local?), index manager 112 may include logic and/or features configured to determine whether to forward the storage service string (e.g., via forward feature 216) to a local storage device driver maintained at system 100 (e.g., storage device driver 130). If the storage service string is to be forwarded to a local storage device driver, the process moves to block 840. Otherwise, the process moves to block 850.

Moving from decision block 830 to block 840 (Forward to Local Storage Device Driver), index manager 112 may include logic and/or features configured to forward the storage service string to the local storage device driver (e.g., via forward feature 216). In some examples, the storage service string in the format of string format 500 may include an indication of "local host" in field 520. Based on an indication of a local host the storage service string may be forwarded to a storage device driver that is local to system 100. As describe above for FIG. 1, storage device driver 120 may be local to system 100. As a result of being local to system 100, the storage service string may be forwarded via internal communication link 140. Storage device driver 120 may allocate the block of persistent storage from persistent storage accessible to storage device driver 120. For example, persistent storage 132-1 to 132-*n* maintained by persistent storage device 130 may be accessible to persistent storage 132-1 to 132-*n* via an internal communication link 150.

Moving from decision block 830 to block 850 (Forward to Remote Storage Device Driver), index manager 112 may include logic and/or features configured to forward the storage service string to a remotely located storage device driver (e.g., via forward feature 216). In some examples, the storage service string in the format of string format 500 may include an indication of "remote host" in field 520. Based on an indication of a remote host the storage service string may be forwarded to a storage device driver that is remote to system 100. As a result of being remote to system 100, the storage service string may be forwarded to a remotely located storage device driver via external communication link 162*a* through external communication interface 160.

According to some examples, the remote storage device driver may allocate the block of persistent storage from persistent storage accessible to the remote storage device driver. According to some examples, the storage service string may be forward through an external communication interface 160 that may be communicatively coupled with the remote storage device driver via a first network communication link (e.g., the Internet or an Intranet). The remote storage device may then have access to the persistent storage via a second network communication link (e.g., an internal communication link or a local area network).

Continuing from either block 840 or block 850 to decision block 860 (More Blocks Needed?), index manager 112 may include logic and/or features configured to determine whether a need exists to allocate another block of persistent storage (e.g., via generate feature 212). In some examples, a need may exist if application 110 requires additional blocks of persistent storage in order to support a task that application 110 may be performing or made need to perform in the future. If a need exists for another block of persistent, the process moves back to block 810. Otherwise, the process ends.

In some other examples, a need may exist for possibly backing up or replicating data that may be stored in the allocated block of persistent storage. For these other examples, using any cryptographic hash function, a pseudo-random identification may be generated deterministically from the UUID associated with the block of persistent storage just allocated. Thus, any number of derivative identifications may be generated for backup or replication purposes to separate/other blocks of persistent storage. The process may then move back to block 810, but instead of generating a separate UUID, a derivative of the UUID may be generated and the same metadata may be included when forming a storage service string for the allocation of the separate/other blocks of persistent storage.

Figure 9:
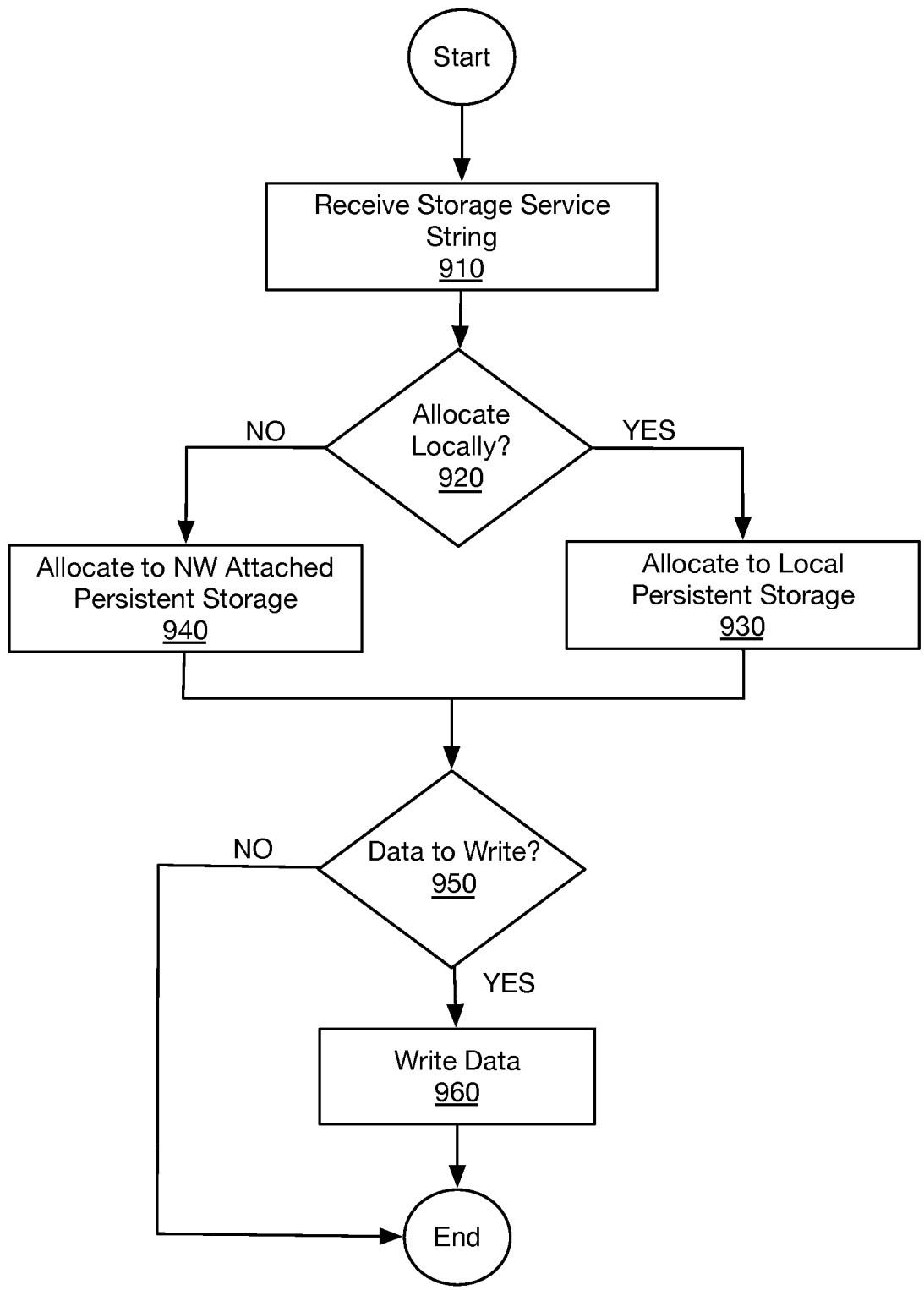
FIG. 9 illustrates a flow chart of example methods for allocating a block of persistent storage.

FIG. 9 illustrates a flow chart of example methods for allocating a block of persistent storage. In some examples, system 100 as shown in FIG. 1, is used to illustrate example methods related to the flow chart depicted in FIG. 9. A service manager 122 as shown in FIG. 3, a storage service string in the format of string format 500 as shown in FIG. 5, or a block of persistent storage 132-4 as shown in FIG. 7 may also be used to illustrate the example methods. But the described methods are not limited to implementations as shown in or described for FIG. 1, 3, 5, 7 or 9. The example methods may be implemented on other systems or managers having one or more of the elements depicted in FIG. 1 or 3. Also, other formats than string format 500 or other configurations of blocks of persistent storage as shown in FIG. 7 may be used when implementing the example methods.

Moving from the start and beginning at block 910 (Receive Storage Service String), storage device driver 120 may include a service manager 122 having logic and/or features configured to receive a storage service string (e.g., via receive feature 312) for allocating a block of persistent storage. The storage service string may be in the format of string format 500. In some examples, as mentioned above, the storage service string may include, among other information/indicators, a UUID and metadata which may be encoded using the REST architectural style to form a URI. Also, the storage service string may or may not include a data payload to be potentially stored in the block of persistent storage.

Continuing from block 910 to decision block 920 (Allocate Locally?), service manager 122 may include logic and/or features configured to determine whether to allocate the block of persistent storage (e.g., via allocate feature 314) from persistent storage maintained by persistent storage device 130 at system 100. If the block of persistent storage is to be allocated from persistent storage maintained by persistent storage device 130 at system 100, the process moves to block 930. Otherwise, the process moves to block 940.

Moving from decision block 920 to block 930 (Allocate to Local Persistent Storage), service manager 122 may include logic and/or features configured to allocate the block of persistent storage (e.g., via allocate feature 314) from persistent storage maintained by persistent storage device 130 at system 100. In some examples, allocation of the block of persistent storage may include the logic and/or features to allocate and/or cause memory cells associated with the persistent storage (e.g., 132-1 or 132-*n*) to be configured based, at least in part, on the received storage service string.

Moving from decision block 920 to block 940 (Allocate to NW Attached Persistent Storage), service manager 122 may include logic and/or features configured to allocate the block of persistent storage (e.g., via allocate feature 314) from persistent storage maintained by persistent storage device 130 at a location remote to system 100. In some examples, the persistent storage may be remotely attached to system 100 through external communication interface 160. Thus, the remotely attached persistent storage may be network (NW) attached persistent storage. For these examples, allocation of the block of persistent storage may include the logic and/or features to allocate and/or cause memory cells associated with the remote/NW attached persistent storage (e.g., 132-1 or 132-*n*) to be configured based, at least in part, on the received storage service string.

Continuing from either block 930 or block 940 to decision block 950 (Data to Write?), service manager 122 may include logic and/or features configured to determine whether data needs to be written to the allocated block of persistent storage (e.g., via read/write feature 316). Also, according to some examples, if the storage service string includes a data payload to be stored in the allocated block of persistent storage, the process moves to block 960. Otherwise, the process ends.

Moving from decision block 950 to block 960 (Write Data), service manager 122 may include logic and/or features configured to write data to the allocated block of persistent storage (e.g., via read/write feature 316). As mentioned previously, a storage service string in the format of string format 500 may comprise a URI that encodes the UUID and metadata in accordance with the REST architectural style. In some examples, HTTP may be used to indicate that the data payload is to be written to the allocated block of persistent storage. For example, HTTP POST and UPDATE requests may be associated with the received storage service string. Based on the POST or UPDATE request service manager 122 may write the data in the data payload to the allocated block of persistent storage. Once the data in the data payload is written to the allocated block of persistent storage the process ends.

According to some examples, writing the data to the allocated block of persistent storage may involve the use of a cryptographic protocol to sign at least portions of data on write (e.g., by an application or a storage device driver). The signed data may subsequently be verified on read using the cryptographic protocol (e.g., by the application or the storage device driver). The cryptographic protocol may be Data Encryption Standard (DES), Advanced Encryption Standard (AES), Public-key or other types of cryptographic protocols.

Figure 10:
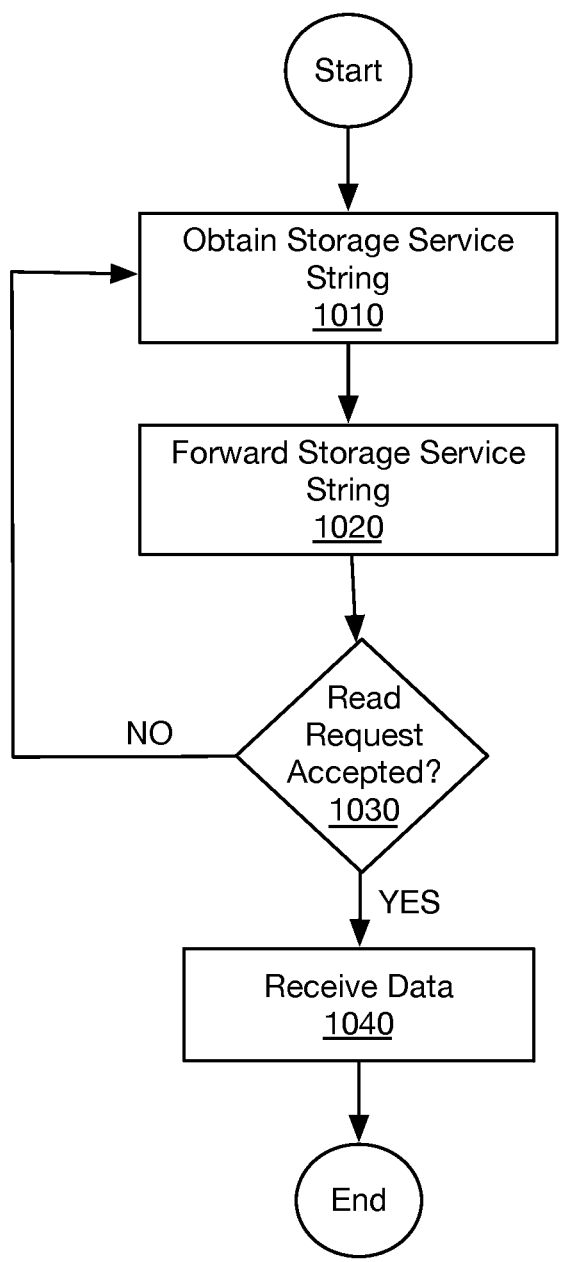
FIG. 10 illustrates a flow chart of example methods for a file system or application to access a block of persistent storage.

FIG. 10 illustrates a flow chart of example methods for a file system or application to access a block of persistent storage. In some examples, system 100 as shown in FIG. 1, is used to illustrate example methods related to the flow chart depicted in FIG. 10. An index manager 112 as shown in FIG. 2, a service manager 122 as shown in FIG. 3, a storage service string in the format of string format 500 as shown in FIG. 5, or a block of persistent storage 132-4 as shown in FIG. 7 may also be used to illustrate the example methods. But the described methods are not limited to implementations as shown in or described for FIG. 1, 2, 3, 5, 7 or 10. The example methods may be implemented on other systems or managers having one or more of the elements depicted in FIGS. 1-3. Also, other formats than string format 500 or other configurations of blocks of persistent storage as shown in FIG. 7 may be used when implementing the example methods.

Moving from the start and beginning at block 1010 (Obtain Storage Service String), index manager 112 may include logic and/or features configured to obtain a storage service string (e.g., via obtain feature 218). In some examples, the storage service string may be obtained from SNBI table 114 maintained by application 110. In alternative examples, the storage service string may be obtained from an SNBI table maintained by an application remote to system 100 (e.g., via external communication link 162a through external communication interface 160). The obtained storage service string may be in the format of string format 500. In some examples, as mentioned above, the storage service string may include, among other information/indicators, a UUID and metadata which may be encoded using the REST architectural style to form a URI.

Continuing from block 1010 to block 1020 (Forward Storage Service String), index manager 112 may include logic and/or features configured to forward the storage service string (e.g., via forward feature 216) to a storage device driver to submit a read request for a storage service associated with a block of persistent storage. In some examples, the storage service string may include information to indicate that the storage device driver is located locally (e.g., local host indicated). If local, the storage service string may be forwarded to the local storage device driver (e.g., storage device driver 120) to submit the read request for the storage service. In alternative examples, the storage service string may include information to indicate that the storage device driver is located remotely (e.g., remote host indicated). If remote, the storage service string may be forwarded to the remote storage device driver (e.g., via a first network communication link coupled to external communication interface 160) to submit the read request for the storage service. According to some examples, the read request for the storage service associated with the block of persistent storage may include obtaining data maintained in the block of persistent storage. As mentioned previously, a storage service string in the format of string format 500 may comprise a URI that encodes the UUID and metadata in accordance with the REST architectural style. In some examples, HTTP may be used to also indicate that a read request is being submitted. For example, an HTTP GET may be forwarded with the storage service string to indicate that a read request is being submitted for the storage service associated with the block of persistent storage.

Continuing from block 1020 to decision block 1030 (Read Request Accepted?), index manager 112 may include logic and/or features configured to determine whether an indication has been received (e.g., data associated with the read request is provided) to indicate if the read request has been accepted or granted (e.g., via receive feature 219). If the read request is accepted, the process moves to block 1040. Otherwise, the process moves back to block 1010 and another storage service string may be obtained.

In some examples, the metadata included with the storage service string may indicate a characteristic, such as an expiration date or a limit on reads per day for a storage service associated with the block of persistent storage. For these examples, the read request may be accepted or rejected based, at least in part, on the characteristic. For example, an expiration date has expired or a threshold number for reads in a day has been exceeded may cause the request to be rejected.

Moving from decision block 1030 to block 1040 (Receive Data), index manager 112 may include logic and/or features configured to receive data associated with the read request. (e.g., via receive feature 219). In some example, the data, for example, may be used by application 110 to perform a task for system 100. Once the data is received the process ends.

As mentioned above, data written to the allocated block of persistent storage may involve the use of a cryptographic protocol to sign at least portions of data on write and then to verify the data on read (e.g., by an application or storage device driver). In some examples, index manager 112 may include logic and/or features configured to receive the data associated with the read request and the logic and/or features may use the cryptographic protocol to verify the authenticity of the data.

FIG. 11 illustrates a block diagram of an example computer program product 1100. In some examples, as shown in FIG. 11, computer program product 1100 includes a signal bearing medium 1102 that may also include instructions 1104 for a file system or application to access a block of persistent storage. Instructions 1104, which, when executed by logic (e.g., index logic 210), may cause the logic to obtain a storage service string that includes a universally unique identifier and metadata. The metadata may indicate one or more characteristics for a storage service associated with the block of persistent storage. The instructions 1104 may also cause the logic to forward the storage service string to a storage device driver to submit a read request for the storage service associated with the block of persistent storage. In some examples, based, at least in part, on the storage service string, the storage device driver may be configured to fulfill the read request by accessing the block of persistent storage from persistent storage accessible to the storage device driver.

Also depicted in FIG. 11, in some examples, computer product 1100 may include one or more of a computer readable medium 1106, a recordable medium 1108 and a communications medium 1110. The dotted boxes around these elements depict different types of mediums included within, but not limited to, signal bearing medium 1102. These types of mediums may distribute instructions 1104 to be executed by logic (e.g., index logic 210 or service logic 310). Computer readable medium 1106 and recordable medium 1108 may include, but are not limited to, a flexible disk, a hard disk drive (HDD), a Compact Disc (CD), a Digital Versatile Disk (DVD), a digital tape, a computer memory, etc. Communications medium 1110 may include, but is not limited to, a digital and/or an analog communication medium (e.g., a fiber optic cable, a waveguide, a wired communication link, a wireless communication link, etc.).

Figure 12:
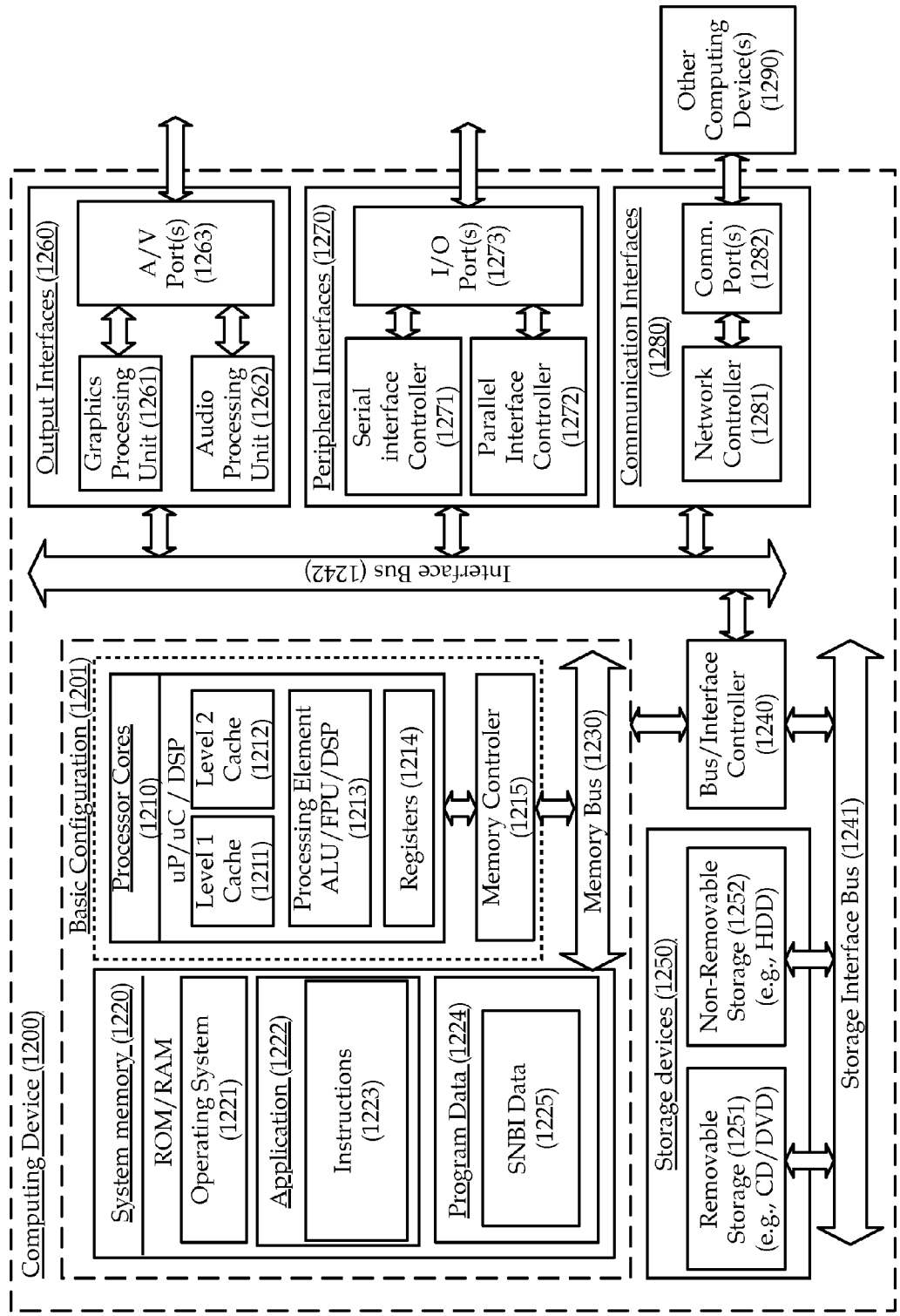
FIG. 12 illustrates an example computing device.

FIG. 12 illustrates an example computing device 1200. In some examples, index manager 112 or service manager 122 depicted in FIGS. 1-3 may be implemented on computing device 1100. In these examples, elements of computing device 1200 may be arranged or configured for allocating a block of persistent storage or for a file system or application to access a block of persistent storage. In a very basic configuration 1201, computing device 1200 typically includes one or more processors 1210 and system memory 1220. A memory bus 1230 can be used for communicating between the processor 1210 and the system memory 1220.

Depending on the desired configuration, processor 1210 can be of any type including but not limited to a microprocessor (μP), a microcontroller (μC), a digital signal processor (DSP), or any combination thereof. Processor 1210 can include one or more levels of caching, such as a level one cache 1211 and a level two cache 1212, a processor core 1213, and registers 1214. The processor core 1213 can include an arithmetic logic unit (ALU), a floating point unit (FPU), a digital signal processing core (DSP Core), or any combination thereof. A memory controller 1215 can also be used with the processor 1210, or in some implementations the memory controller 1215 can be an internal part of the processor 1210.

Depending on the desired configuration, the system memory 1220 can be of any type including but not limited to volatile memory (such as RAM), non-volatile memory (such as ROM, flash memory, etc.) or any combination thereof. System memory 1220 typically includes an operating system 1221, one or more applications 1222, and program data 1224. Application 1222 includes instructions 1223 that are arranged to perform the functions as described herein including the actions described with respect to the index manager 112 architecture shown in FIG. 2 or to the service manager 122 architecture shown in FIG. 3. Program Data 1224 includes SNBI data 1225 that is useful for implementing instructions 1223 (e.g., forming and/or reading storage service strings). In some examples, application 1222 can be arranged to operate with program data 1224 on an operating system 1221 such that implementations of allocating a block of persistent storage or accessing a block of persistent storage may be provided as described herein. This described basic configuration is illustrated in FIG. 12 by those components within dashed line 1201.

Computing device 1200 can have additional features or functionality, and additional interfaces to facilitate communications between the basic configuration 1201 and any required devices and interfaces. For example, a bus/interface controller 1240 can be used to facilitate communications between the basic configuration 1201 and one or more data storage devices 1250 via a storage interface bus 1241. The data storage devices 1250 can be removable storage devices 1251, non-removable storage devices 1252, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 1220, removable storage 1251 and non-removable storage 1252 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1200. Any such computer storage media can be part of device 1200.

Computing device 1200 can also include an interface bus 1242 for facilitating communication from various interface devices (e.g., output interfaces, peripheral interfaces, and communication interfaces) to the basic configuration 1201 via the bus/interface controller 1240. Example output interfaces 1260 include a graphics processing unit 1261 and an audio processing unit 1262, which can be configured to communicate to various external devices such as a display or speakers via one or more A/V ports 1263. Example peripheral interfaces 1260 include a serial interface controller 1271 or a parallel interface controller 1272, which can be configured to communicate with external devices such as input devices (e.g., keyboard, mouse, pen, voice input device, touch input device, etc.) or other peripheral devices (e.g., printer, scanner, etc.) via one or more I/O ports 1273. An example communication interface 1280 includes a network controller 1281, which can be arranged to facilitate communications with one or more other computing devices 1290 over a network communication via one or more communication ports 1282. A network communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 1200 can be implemented as a portion of a small-form factor portable (or mobile) electronic device such as a cell phone, smart phone, a personal data assistant (PDA), a personal media player device, a wireless web-watch device, a personal headset device, an application specific device, or a hybrid device that include any of the above functions. Computing device 1200 can also be implemented as a personal computer including both laptop computer and non-laptop computer configurations or implemented in a workstation or a server configuration.

References made in this disclosure to the term "responsive to" or "in response to" are not limited to responsiveness to a particular feature and/or structure. A feature may also be responsive to another feature and/or structure and also be located within that feature and/or structure. Moreover, when terms or phrases such as "coupled" or "responsive" or "in response to" or "in communication with", etc. are used herein or in the claims that follow, these terms should be interpreted broadly. For example, the phrase "coupled to" may refer to being communicatively, electrically and/or operatively coupled as appropriate for the context in which the phrase is used.

Those skilled in the art will recognize that it is common within the art to describe devices and/or processes in the fashion set forth herein, and thereafter use engineering practices to integrate such described devices (e.g., transmitters, receivers, wireless devices, computing platforms, computing devices, etc.) and/or methods into data processing systems. That is, at least a portion of the devices and/or methods described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available component, such as those typically found in data computing/communication and/or network computing/communication systems.

The herein described subject matter sometimes illustrates different components or elements contained within, or connected with, different other components or elements. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for allocating a block of persistent storage comprising:

generating a universally unique identifier for the block of persistent storage;

forming a storage service string to include the universally unique identifier and metadata, the metadata to indicate one or more characteristics for a storage service associated with the block of persistent storage; and forwarding the storage service string to a storage device driver, wherein based, at least in part, on the storage service string, the storage device driver is to be configured to allocate the block of persistent storage from persistent storage accessible to the storage device driver.

2. A method according to claim 1, further comprising:
creating an entry in a sparse non-deterministic block index, the entry to include the universally unique identifier and associated metadata for the allocated block of persistent storage, wherein the sparse non-deterministic block index is to be available to one or more applications and/or file systems interconnected via one or more network communication links.

3. A method according to claim 1, wherein the one or more characteristics for the storage service comprises:
a size for the block of persistent storage;
an expiration time period for the block of persistent storage;
a number of allowed reads per given time period for the block of persistent storage; or
a number of allowed writes per given time period for the block of persistent storage.

4. A method according to claim 3, wherein the expiration time period comprises an indication of a number of seconds since an epoch from which the block of persistent storage is set to expire, the epoch to be based on a date of Jan. 1, 1970.

5. A method according to claim 1, wherein generating a universally unique identifier comprises a file system or application generating a 32-byte random number.

6. A method according to claim 1, wherein forming the storage service string comprises encoding the universally unique identifier and metadata using Representational State Transfer (REST) architectural style to form a Uniform Resource Identifier (URI).

7. A method according to claim 6, wherein the URI includes an indication of a host associated with a location for the persistent storage accessible by the storage device driver.

8. A method according to claim 6, wherein forwarding the storage service string to a storage device driver comprises forwarding the storage service string using Hypertext Transfer Protocol (HTTP).

9. A method according to claim 1, wherein forwarding the storage service string to the storage device driver comprises forwarding the storage service string to the storage device driver via a first network communication link and the persistent storage to be accessible to the storage device driver via a second network communication link.

10. A method according to claim 1, wherein forwarding the storage service string to the storage device driver comprises forwarding the storage service string to the storage device driver via a first local communication link and the persistent storage to be accessible to the storage device driver via a second local communication link.

11. A method according to claim 1, further comprising:
using a cryptographic hash function to deterministically generate a pseudo-random identification from the universally unique identifier;
forming another storage service string to include the pseudo-random unique identifier and metadata, the metadata to indicate the one or more characteristics for the storage service associated with the allocated block of persistent storage; and
forwarding the other storage service string to the storage device driver, wherein based, at least in part, on the other storage service string, the storage device driver is to be configured to allocate a separate block of persistent storage from the persistent storage accessible to the storage device driver.

12. A method for allocating a block of persistent storage comprising:
at a storage device driver, receiving a storage service string that includes a universally unique identifier and metadata, the metadata to indicate one or more characteristics for a storage service associated with the block of persistent storage; and
allocating the block of persistent storage based, at least in part, on the storage service string, wherein the block of persistent storage is allocated from available persistent storage accessible to the storage device driver.

13. A method according to claim 12, wherein the one or more characteristics for the storage service comprises:
a size for the block of persistent storage;
an expiration time period for the block of persistent storage;
a number of allowed reads per given time period for the block of persistent storage; or
a number of allowed writes per given time period for the block of persistent storage.

14. A method according to claim 12, wherein the universally unique identifier comprises a 32-byte number that was randomly generated by a file system or application that forwarded the received storage service string.

15. A method according to claim 12, wherein the storage service string comprises a Uniform Resource Identifier (URI) that encodes the universally unique identifier and metadata in accordance with Representational State Transfer (REST) architectural style.

16. A method according to claim 15, wherein receiving the storage service string comprises receiving the storage service string using Hypertext Transfer Protocol (HTTP).

17. A method according to claim 12, wherein the URI includes an indication of a host associated with a location for the persistent storage accessible by the storage device driver.

18. A method according to claim 12, further comprising:
writing to the allocated block of persistent storage, wherein writing to the allocated block of persistent storage includes using a cryptographic protocol to sign at least a portion of data to be written to the allocated block of persistent storage.

19. A method for a file system or application to access a block of persistent storage comprising:
obtaining a storage service string that includes a universally unique identifier and metadata, the metadata to indicate one or more characteristics for a storage service associated with the block of persistent storage; and
forwarding the storage service string to a storage device driver to submit a read request for the storage service associated with the block of persistent storage, wherein based, at least in part, on the storage service string, the storage device driver is to be configured to fulfill the read request by accessing the block of persistent storage from persistent storage accessible to the storage device driver.

20. A method according to claim 19, further comprising:
accessing an entry in a sparse non-deterministic block index to obtain the storage service string, the entry to include the universally unique identifier and associated metadata for the block of persistent storage, wherein the sparse non-deterministic block index is to be available to the file system or application via a local communication link or a network communication link.

21. A method according to claim 19, wherein the one or more characteristics for the storage service comprises:
a size for the block of persistent storage;
an expiration time period for the block of persistent storage;
a number of allowed reads per given time period for the block of persistent storage; or a number of allowed writes per given time period for the block of persistent storage.

22. A method according to claim 21, wherein the expiration time period comprises an indication of a number of seconds since an epoch from which the block of persistent storage is set to expire, the epoch to be based on a date of Jan. 1, 1970.

23. A method according to claim 19, wherein the storage service string comprises a Uniform Resource Identifier (URI) that encodes the universally unique identifier and metadata in accordance with Representational State Transfer (REST) architectural style.

24. A method according to claim 23, wherein forwarding the storage service string to the storage device driver comprises forwarding the storage service string using Hypertext Transfer Protocol (HTTP).

25. A method according to claim 19, wherein forwarding the storage service string to the storage device driver comprises forwarding the storage service string to the storage device driver via a first network communication link and the storage device driver to access the persistent storage via a second network communication link.

26. An apparatus for fulfilling a read request associated with a block of persistent storage, the apparatus comprising:
a service manager having logic, the logic configured to:
receive a storage service string that includes a universally unique identifier and metadata, the metadata to indicate one or more characteristics for a storage service associated with the block of persistent storage; and
fulfill the read request by accessing the block of persistent storage and provide data maintained therein to the requestor based, at least in part, on the storage service string.

27. An apparatus according to claim 26, wherein the universally unique identifier and associated metadata included in the storage service string were obtained by the requester from an entry in a sparse non-deterministic block index that is available to one or more applications and/or file systems interconnected via one or more network communication links.

28. An apparatus according to claim 26, wherein the one or more characteristics for the storage service comprises:
a size for the block of persistent storage;
an expiration time period for the block of persistent storage;
a number of allowed reads per given time period for the block of persistent storage; or
a number of allowed writes per given time period for the block of persistent storage.

29. An apparatus according to claim 26, wherein the universally unique identifier comprises a 32-byte number that was randomly generated by the originator of the received storage service string.

30. An apparatus according to claim 26, wherein the storage service string comprises a Uniform Resource Identifier (URI) that encodes the universally unique identifier and metadata in accordance with Representational State Transfer (REST) architectural style.

31. An apparatus according to claim 30, wherein the URI includes an indication of a host associated with a location for persistent storage that includes the block of persistent storage.

32. An apparatus according to claim 30, wherein to receive the storage service string comprises to receive the storage service string using Hypertext Transfer Protocol (HTTP).

33. A system for allocating a block of persistent storage comprising:
a persistent storage device;
an application including an index manager having index logic, the index logic configured to:
generate a universally unique identifier for the block of persistent storage;
form a storage service string to include the universally unique identifier and metadata, the metadata to indicate one or more characteristics for a storage service associated with the block of persistent storage; and
forward the storage service string to submit an allocation request for the block of persistent storage; and
a storage device driver including a service manager having service logic, the service logic configured to:
receive the storage service string forwarded from the application; and
allocate the block of persistent storage to fulfill the allocation request based, at least in part, on the storage service string, wherein the block of persistent storage is allocated from available persistent storage maintained at the persistent storage device.

34. A system according to claim 33, wherein the index logic is further configured to:
create an entry in a sparse non-deterministic block index, the entry to include the universally unique identifier and associated metadata for the allocated block of persistent storage, wherein the sparse non-deterministic block index is to be available to the application and one or more other applications and/or file systems interconnected via one or more network communication links.

35. A system according to claim 33, wherein the one or more characteristics for the storage service comprises:
a size for the block of persistent storage;
an expiration time period for the block of persistent storage;
a number of allowed reads per given time period for the block of persistent storage; or
a number of allowed writes per given time period for the block of persistent storage.

36. A system according to claim 33, wherein to form the storage service string comprises the index logic further configured to encode the universally unique identifier and metadata using Representational State Transfer (REST) architectural style to form a Uniform Resource Identifier (URI).

37. A system according to claim 36, wherein the URI includes an indication of a host associated with a location for the persistent storage device.

38. A system according to claim 33, wherein to forward the storage service string to a storage device driver comprises the index logic further configured to forward the storage service string using Hypertext Transfer Protocol (HTTP).

39. A system according to claim 33, wherein to forward the storage service string to the storage device driver comprises the index logic further configured to forward the storage service string to the storage device driver via a first network communication link and the persistent storage device to be accessible to the service logic of the storage device driver via a second network communication link.

40. A computer program product comprising a non-transitory medium having instructions for a file system or application to access a block of persistent storage, which, when executed by logic, cause the logic to:
obtain a storage service string that includes a universally unique identifier and metadata, the metadata to indicate one or more characteristics for a storage service associated with the block of persistent storage; and
forward the storage service string to a storage device driver to submit a read request for the storage service associated with the block of persistent storage, wherein based, at least in part, on the storage service string, the storage device driver is to be configured to fulfill the read request by accessing the block of persistent storage from persistent storage accessible to the storage device driver.

41. A computer program product according to claim 40, further comprising instructions to cause the logic to:
access an entry in a sparse non-deterministic block index to obtain the storage service string, the entry to include the universally unique identifier and associated metadata for the block of persistent storage, wherein the sparse non-deterministic block index is to be available to the file system or application via a local communication link or a network communication link.

42. A computer program product according to claim 40, wherein the one or more characteristics for the storage service comprises:
a size for the block of persistent storage;
an expiration time period for the block of persistent storage;
a number of allowed reads per given time period for the block of persistent storage; or
a number of allowed writes per given time period for the block of persistent storage.

43. A computer program product according to claim 40, wherein the storage service string comprises a Uniform Resource Identifier (URI) that encodes the universally unique identifier and metadata in accordance with Representational State Transfer (REST) architectural style.

44. A computer program product according to claim 43, wherein to forward the storage service string to the storage device driver comprises to forward the storage service string using Hypertext Transfer Protocol (HTTP).

45. An apparatus for storing data, the apparatus comprising:
one or more blocks of persistent storage, each block of persistent storage to be configured such that separate blocks of persistent storage are allocated to separate universally unique identifiers, wherein the separate blocks of persistent storage are also configured to store variable blocks of data based, at least in part, on separate storage service strings respectively associated with the separate universally unique identifiers.

46. An apparatus according to claim 45, wherein a separate storage service string from among the separate storage service strings respectively associated with the separate universally unique identifiers comprises the separate storage service string to also include metadata, the metadata to indicate one or more characteristics for a storage service associated with a block of persistent storage from among the separate blocks of persistent storage.

47. An apparatus according to clam 46, wherein the one or more characteristics for the storage service comprises:
a size for the block of persistent storage;
an expiration time period for the block of persistent storage;
a number of allowed reads per given time period for the block of persistent storage; or
a number of allowed writes per given time period for the block of persistent storage.

48. An apparatus according to claim 45, wherein the one or more blocks of persistent storage comprise memory cells for at least one of a solid state hard drive or a hard disk drive.

\* \* \* \* \*